March 10, 1942.　　　　W. C. HAHN　　　　2,276,247
HIGH FREQUENCY MODULATING SYSTEM
Filed Sept. 27, 1939　　　3 Sheets-Sheet 1

Inventor:
William C. Hahn,
by Harry E. Dunham
His Attorney.

Inventor:
William C. Hahn,
by Harry E. Dunham
His Attorney.

Patented Mar. 10, 1942

2,276,247

UNITED STATES PATENT OFFICE 2,276,247

HIGH FREQUENCY MODULATING SYSTEM

William C. Hahn, Schenectady, N. Y., assignor to General Electric Company, a corporation of New York Application September 27, 1939, Serial No. 296,749

7 Claims. (Cl. 179—171.5)

The present invention relates to a modulating system for use at ultra high frequencies.

It is an object of the invention to provide means by which a carrier wave having a wave length on the order of from one meter to five centimeters or less may be effectively modulated with a signal of greater wave length.

It is a further and more particular object of the invention to produce modulation under the conditions indicated above which is substantially linear through a range of from zero to one-hundred per cent modulation.

The features of the invention which I desire to protect herein are pointed out with particularity in the appended claims. The invention itself, together with further objects and advantages thereof may best be understood by reference to the following description taken in connection with the drawings in which Figs. 1 and 2 comprise imaginative representations useful in explaining the invention.

Before proceeding to a detailed description of the invention, it will be helpful to refer briefly to certain principles which govern the operation of apparatus of the type which is to be considered herein.

In my prior Patent No. 2,220,839, granted November 5, 1940, it is pointed out that if a uniform stream of electrons is caused to traverse a region which is subjected to cyclically variable potential gradients, the successive elements of the beam will be differently affected as to velocity. That is to say, electrons which traverse the region when the gradient in it is positive will be accelerated, while electrons which enter the region during a period of negative potential gradient will be decelerated. Thus, if the potential applied to the said region is of cyclically reversible character, the portion of the beam issuing from the region will be "velocity modulated" in the sense of being characterized by alternate components of high and low velocity.

Figure 1:
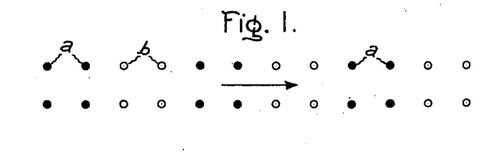
Figure 2:
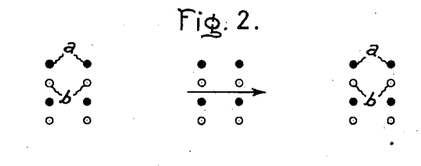

The condition existing in a velocity modulated beam is illustrated schematically in Fig. 1 wherein the black dots $a$ may be taken to represent relatively fast electrons and the light dots $b$ to represent relatively slow electrons. At the instant the beam emerges from the modulating space, the charge density in it may still be substantially uniform as shown. However, at a somewhat later time if no further disturbance of the beam is permitted, a regrouping of electrons will occur as a result of the tendency of the faster electrons to catch up with the slower ones. Thus, Fig. 2 represents the condition of the beam of Fig. 1 after the beam has traversed a drift space of substantial length; that is, after an appreciable time has elapsed. It will be noted that in the condition shown, the beam is "charge density modulated" in the sense of being characterized by unequal space distribution of electrons.

The apparatus to be described in the following makes use of the phenomena described above in that it employs the expedient of successively producing velocity modulation of an electron beam and thereafter converting the velocity modulation into charge density modulation for the accomplishment of certain desired results.

Figure 3:
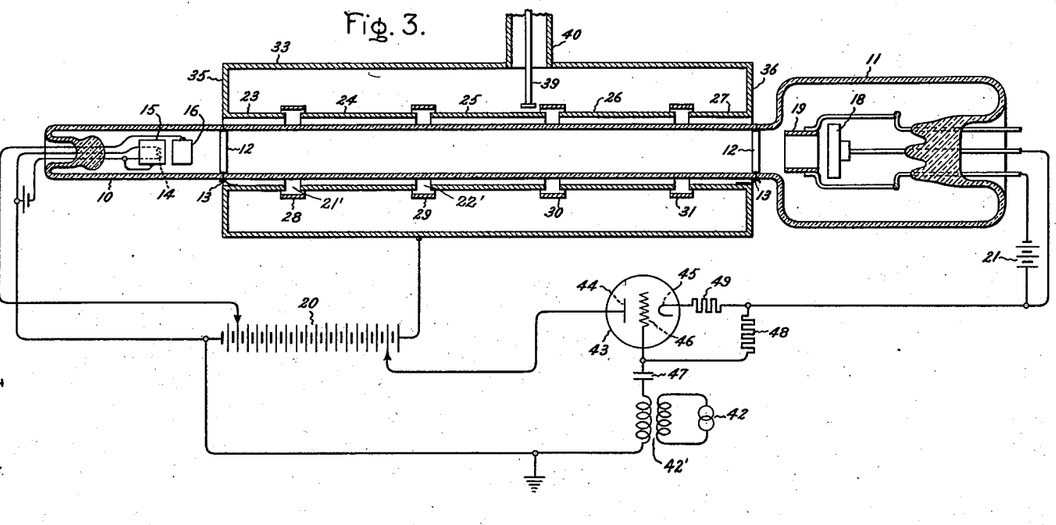
Fig. 3 ilustrates schematically the combination of a discharge device and circuit embodying the invention.

Referring particularly to Fig. 3 there is shown the combination of a high frequency discharge device and a circuit for modulating the output of the same in accordance with the principles of my present invention. The discharge device per se has already been described and claimed in my prior Patent No. 2,222,902, granted November 26, 1940, and is therefore not intended to be claimed herein.

For the purposes of convenient exposition, it is proposed in the following to describe the discharge device illustrated in Fig. 3 first with reference to structure, then with reference to function, and finally to proceed to a detailed explanation of the modulating system provided in connection with the device.

The device itself comprises an evacuated envelope having an elongated shaft portion 10 and an enlarged anode-containing portion 11. This envelope may be suitably constituted of quartz or of low loss glass.

The shaft portion 10 encloses means such as a known type of electron gun for producing an electron beam. The combination shown comprises a filamentary cathode 14, which is indicated in dotted outline, and a cylinder 15 for confining the emitted electrons to a concentrated beam. The cylinder may be either connected directly to the cathode as shown or maintained at a few volts negative or positive with respect to it. In order to accelerate the electrons to a desired extent there is provided an accelerating electrode 16 which is spaced from the cathode and which may be biased to a suitable positive potential, say, several hundred volts.

In order that the intermediate portion of the beam path may be maintained at a desired potential level there are provided a pair of intermediate electrodes 12 which suitably comprise rings of conducting material such as colloidal graphite applied to the inner wall surface of the envelope. These are connected with external elements by means of appropriate lead-in connections 13. In order to maintain the beam in focus during its passage along the shaft 10 there may be provided a number of magnetic focusing coils (not shown).

After traversing the envelope, the electron beam is collected by a collecting anode 18 which is exemplified in the drawings as being in the form of a flat disk, suitably consisting of graphite. A tubular electrode 19 in the nature of a suppressor grid serves to prevent secondary electrons emitted by the anode from returning to the discharge space.

In the operation of the device the cathode 14 is maintained at ground potential, the intermediate electrodes 12 at one thousand to several thousand volts above ground, and the anode 18 at a high potential intermediate between that of the cathode and the said electrodes. These potential relationships are established by means of a suitable source of potential, such source being conventionally represented in the drawings as a battery 20. The suppressor grid 19 is biased fifty to several hundred volts negative with respect to the anode 18 by means of a potential source 21.

The combination of elements so far described comprises means for producing a unidirectional electron beam of substantially constant average intensity and velocity. Outside the envelope there is provided an electrode arrangement for influencing the beam at radio frequencies. This arrangement includes a series of tubular electrode elements (numbered 23 to 27 inclusive) which are disposed at spaced intervals along the axis of the envelope 10. These elements, which consist of a conductive material such as copper, may be maintained in spaced relation by means of insulating supports (not shown). The various gaps which exist between the electrode elements are at least partially surrounded by capacitance-determining rings 28 to 31 which serve a function to be described hereinafter. These rings, which may be supported by appropriate means, (not shown) are radially spaced from the electrode elements so as not to form a conductive connection across the gaps. The electrode elements and the rings above referred to are concentrically enclosed within a conducting shell 33 which extends along a substantial portion of the entire length of the envelope shaft. A connection between the end elements 23 and 27 and the shell is provided by means of annular metal diaphragms 35 and 36 which extend transversely with respect to the axis of the envelope.

The apparatus so far described may be viewed in two aspects. In the first, it comprises electrode structure for influencing the electron beam which traverses the envelope 10. In the second, it may be considered as comprising a resonant system adapted to be maintained in continuous oscillation by virtue of the reaction of the beam on the electrode elements. The dimensional and electrical correlation of the various parts of the structure should be such as to assure that they function satisfactorily in both the capacities referred to.

Figure 4:
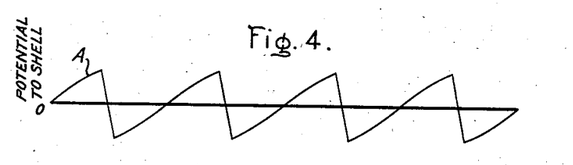
Fig. 4 is a graphical representation of a desired potential distribution from point to point along the electrode structure of the device of Fig. 3.

The end specified in the foregoing paragraph is attained when the apparatus is brought to a condition of operation such as is indicated graphically in Fig. 4. Curve A of this latter figure represents the variation of the potential drop from the elements 23 to 27 to the tubular shell 33 as one proceeds along the axis of the envelope. If the condition illustrated actually prevails, the functioning of the system as a whole simulates that of a resonant circuit of the general form illustrated in Fig. 5. In the figure last referred to, there is shown a series of alternately positioned inductive elements 42 to 46 and capacitive elements 48 to 51, these elements being assumed to be so matched as to produce series resonance. In the relationship indicated, the inductive elements represent the electrodes 23 to 27, viewed as impedance-providing members, and the capacitive elements represent the end to end capacitive coupling between adjacent electrodes. During resonant operation of either the electrode system of Fig. 3 or the circuit system of Fig. 5 there will be an alternate rise and fall of potential level as one proceeds from point to point along the system, such rise and fall being in both cases of the general character indicated in Fig. 4.

Figure 5:
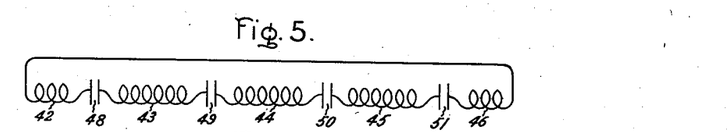
Fig. 5 is a diagram of a circuit which is functionally analogous to the electrode structure of Fig. 3.

The representation of Fig. 5 is only an approximation to the arrangement of Fig. 3 since the elements 23 to 27 may not properly be viewed as of purely inductive character. They are, on the contrary, more in the nature of short sections of transmission line having distributed constants. However, it may be shown that under a particular condition of resonance to be specified in the following, the potential variation along the electrode structure (as measured to the shell 33) is as noted in Fig. 4. That is to say, as one proceeds along the electrode structure from the wall member 35 the potential rises continuously until an interelectrode gap is reached. At the gap, the potential reverses abruptly as a result of the presence of the lumped capacitance which couples the juxtaposed electrode elements 14 and 15, this condition being repetitive for each combination of electrode elements and gaps. The corresponding current distribution along the electrode structure is shown by curve B of Fig. 6.

Figure 7:
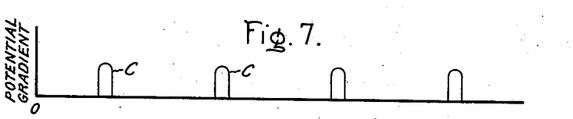

Referring now more particularly to the reaction of the electrode structure upon the electron beam, it will be understood that with the potential relationship shown in Fig. 4 the gap gradients assume a form such as is indicated by the curve C of Fig. 7. In this connection it will be noted that there exists a sharp rise in gradient at the extremity of each element which is followed by an abrupt drop as the edge of the next element is approached. At any given instant the gradients in the various gaps are similarly directed. They are reversed every half-cycle and returned to their original condition at the beginning of the next cycle.

An electron which traverses one of the gaps at a time when a potential gradient exists across it is obviously affected as to velocity. It is desired for present purposes that any given electron shall be similarly affected as it traverses each of the gaps, so that cumulative effects may be obtained. That is to say, it is desired that an electron which is accelerated in the first gap shall be similarly accelerated in each of the remaining gaps, and, on the other hand, that a decelerated electron shall be repetitively decelerated. It should be apparent that this result will obtain if the transit time of a given electron through a single electrode element corresponds approximately to a full cycle of the potential variation. In order to meet this condition, there must be appropriate correlation of the dimensional and electrical characteristics of the various parts. The means to be employed in securing this correlation are briefly outlined in the following.

In this connection it is convenient first to determine an appropriate length for the various elements 24, 25, and 26 (these being each twice as long as the elements 23 and 27). For purposes of calculation it is expedient to express this length as an angle $\theta_g$, measured in such units that one complete wavelength (at the desired operating frequency) is equal to an angle of $\theta_g = 360°$. One expression for $\theta_g$ is given by the following equation (which in turn is derived from more elementary relationships between the beam velocity and the velocity of propagation of an electromagnetic wave):

$$\theta_g = \theta_b \frac{V}{505} \quad (1)$$

In this equation V represents the D. C. voltage through which the beam is accelerated and $\theta_b$ represents the angular part of a complete cycle (at the operating frequency) which is required at such voltage for the transit of an electron completely through one electrode element. As previously stated, it is desirable that $\theta_b$ shall be on the order of 360° or some integral multiple thereof.

The length $\theta_g$ of the electrode element being thus tentatively fixed in terms of independently determinable quantities, it is desirable next to ascertain the electrode capacity required to effect resonant operation of the system (i. e. such operation as to produce the voltage distribution shown in Fig. 4). In this connection, it may be noted from Fig. 4 that the capacitive drop across a given gap must be equal to twice the voltage appearing between either of the adjacent electrode extremities and the shell 33. Furthermore, since the current flow observed in the extremity of any electrode is necessarily identical with that across the contiguous gap, it may be reasoned that the gap capacitance should be made equal to twice the electrode-to-shell impedance at the gap boundary.

In order to determine the electrode-to-shell impedance just mentioned, recourse must be had to transmission line theory, since as has been previously specified, the electrode elements tend to function as transmission line sections. Applying the relevant formula in this connection we may write for the impedance at any point:

$$Z = Z_0 \tan h \ (a + j\theta) \quad (2)$$

where $Z_0$ is the characteristic impedance of the type of line under consideration; $a$ is the attenuation constant; and $\theta$ is the electrical angle measured from a current maximum.

Figure 6:
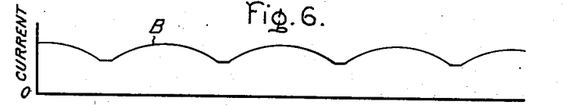
Figs. 6, 7, 8 and 9 are additional graphical representations useful in explaining the invention.

In the present case considerations of symmetry indicate the occurrence of current maxima at the centers of the various electrode elements, as shown in Fig. 6. In order to determine the impedance at the end of an element, therefore, the angle $\theta$ in Equation 2 may be taken as the length of a half element or $$\frac{\theta_g}{2}$$

Also, attenuation can be neglected, so that Equation 2 may be rewritten:

$$Z = Z_0 \tan h \ j\frac{\theta_g}{2} = jZ_0 \tan \frac{\theta_g}{2} \quad (3)$$

Setting this quantity equal to one-half the capacitive impedance of the gap, we have $$jZ_0 \tan \frac{\theta_g}{2} = \frac{j\lambda_0}{4\pi C_g c} \quad (4)$$

where $\lambda_0$ is the desired wavelength of operation, $C_g$ is the gap capacitance, and $c$ is the velocity of light.

For a practical construction, wherein the diameter of the discharge tube is ¾ inch, that of the electrode elements is 1 inch and that of the shell is 2 inches, $Z_0$ is about 41.6 ohms. Therefore, using the previously calculated value of $\theta_g$ and solving Equation 4, the desired value of $C_g$ may readily be ascertained. Once ascertained, it may be realized practically by adjusting the position and dimensions of the capacitance-determining rings 28 to 31.

The discussion up to this point has been mainly concerned with the operation of the apparatus of Fig. 3 viewed solely as a circuit network and without regard to the mode of its excitation. The latter factor will now be brought into the picture by investigating the cooperative reaction of the electrode elements with the electron beam of the tube 9.

In considering the effect of the electrode structure on the beam let it be assumed that a radio frequency voltage of value $V_g$ is by some means impressed across the gap 21'. The velocity modulation produced by such voltage is then $V_g B_1$, where $B_1$ is a factor which takes into account the geometry of the gap, the operating wave length, and the average velocity of the beam.

In accordance with the explanation given in connection with Figs. 1 and 2, the velocity modulation thus produced will cause at least some charge density modulation to exist in the beam issuing from the drift space defined by the electrode element 15. The amount of R. F. conduction current (I) thus developed will be a function of the velocity modulation ($V_g B_1$), of the total beam current ($I_0$), of the D. C. beam voltage (V), and of the electrode length ($\theta_b$). A complete expression for this quantity may be written as follows:

$$I = \frac{jI_0 V_g B_1 \theta_b}{2V} \underline{/\theta_b} \quad (5)$$

As the modulated beam traverses the second interelectrode gap 22' it will induce in the electrode structure a radio frequency current corresponding to the conduction current I but opposite to it in sign.

The actual current thus induced may be written $$I = -IB \quad (6)$$

where B is a factor which takes into account the characteristics of the gap. For reasons which need not be elaborated here, B may be taken as equal to the quantity $B_1$ previously employed above. Consequently, the complete expression for the conduction current induced in the electrode structure is $$I_i = \frac{-jI_0 V_g B_1^2 \theta_b}{2V} \underline{/\theta_b} \quad (7)$$

Now, let it be further assumed that the gap 22' is also subjected to a radio frequency voltage $V_g$, similar in amplitude and phase to the voltage predicated across the gap $21'$. Under these conditions the apparent admittance of the gap $22'$ is $$A = \frac{I_i}{V_g} = \frac{-jI_0V_gB_1{}^2\theta_b}{2VV_g}\underline{/\theta_b} = \frac{-jI_0B_1{}^2\theta_b}{2V}\underline{/\theta_b} \quad (8)$$

This equation may be simplified by grouping the quantities $$\frac{I_0B_1{}^2\theta_b}{2V}$$

as $G_m$, whereupon we have $$A = -jG_m\underline{/\theta_b} \quad (9)$$

The foregoing analysis pertains mainly to the interaction of the beam and electrode system where only two gaps are involved. It must be remembered, however, that in the system under consideration the complete electrode structure involves the use of $n$ gaps each spaced $\theta_b$ (in the beam) apart. Each part has a radio frequency voltage across it and tends to produce a modulating reaction on the beam. Furthermore, each of the electrode elements provides a drift space between two gaps. Thus, the total reaction of the beam on the electrode structure may be derived as follows:

As we have seen, the first gap produces a velocity modulation $V_gB_1$ which in turn results in an apparent admittance at the second gap of $$-jG_m\underline{/\theta_b}$$

(This is on the postulated condition that the gradient in the second gap is in the same direction as in the first.) The admittance of the third gap due to the voltage across the first is $$-j2G_m\underline{/2\theta_b}$$

Similarly, for the fourth gap, the admittance is $$-j3G_m\underline{/3\theta_b}$$

etc.

Now, consider the effect of the voltage across the second gap. The admittance created across the third gap as a result of the modulation produced by this voltage is $-jG_m\theta_b$; that across the fourth gap is $-j2G_m2\theta_b$, etc. Adding the admittance for all gaps, one obtains the total admittance as—

$$A_{tot} = -j(n-1)G_m\underline{/\theta_b} - j2(n-2)G_m\underline{/2\theta_b} -$$
$$j3(n-3)G_m\underline{/3\theta_b}\ldots -j(n-1)G_m\underline{/(n-1)\theta_b} \quad (10)$$

Of this admittance, the conductance component is $$G_t = G_m(n-1)\sin\theta_b + 2(n-2)\sin 2\theta_b + 2(n-3)\sin 3\theta_b \ldots + (n-1)\sin(n-1)\theta_b \quad (11)$$

Figure 8:
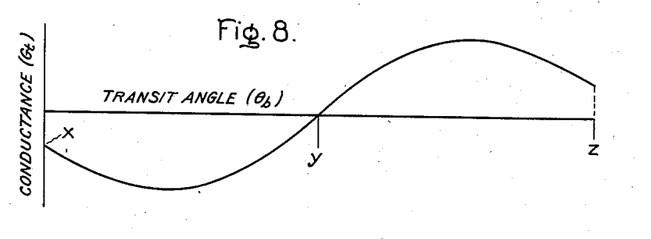

The variation of the conductance $G_t$ with the angle $\theta_b$ is indicated by the graphical representation of Fig. 8. From this figure it will be seen that within the range between the point X and Y the conductance has a negative value, indicative of absorption of energy by the electrode system from the electron beam. Within at least a certain portion of this range, the system may be maintained in high frequency oscillation so that voltage exists across the various gaps even though considerable power is being withdrawn from the system for external utilization. (An exemplary means for such power withdrawal is shown in the drawing as comprising a solid conductor 39, capacitively coupled at its extremity to a point of voltage maximum on the electrode 25, and a tubular conductor 40 adapted to form a concentric transmission line in combination with the extension of conductor 39. These two conductors conjointly form the initial elements of an output circuit adapted for connection with an appropriate utilization device.)

Within the region Y—Z the conductance $G_t$ becomes positive, indicating that the electrode system tends to supply energy to the electron stream, or in other words, that the electron stream tends to exert a damping action on the electrode system. Furthermore, since the quantity $\theta_b$ (i. e. the electron transit time through an electrode element) is, in final analysis, a function of the electron velocity, it may be reasoned that electrons which traverse the electrode system at low velocity, corresponding to the region Y—Z, tend to damp or reduce the oscillation of the system, while electrons of higher velocity, within the range X—Y, tend to increase the amplitude of such oscillation. The importance of this fact in connection with the present invention, will be made apparent in the following:

If the potential of the collector 18 is continuously reduced, a point will eventually be reached at which the slowest moving electrons will just be collected. For still lower potentials these electrons will not be collected but will be reversed and returned along the axis of the tube.

As has been previously explained, the action of a passing electron on the resonant electrode system comprising the elements 23 to 27 is determined by the velocity of such electron. For electron velocities which are high, the reaction is of such character as to excite the electrode system. For velocities which are relatively low, as is true of the reversed electrons now under consideration, the reaction will involve a damping effect which tends to reduce the amplitude of the R. F. voltage developed by the system.

Assuming that the beam approaching the collector is velocity modulated—as is necessarily the case if the resonant electrode system is in an excited condition—it will be seen that the average velocity of the returned electrons is a function not only of the collector potential but also of the amount of velocity modulation. That is to say, if the collector voltage is set at a value at which it is just effective to collect the slowest components of the beam when the latter is in an unmodulated state, some electrons will obviously be reversed as soon as any degree of velocity modulation is established. As long as the amplitude of modulation remains constant the average velocity of the returned electrons will also be constant.

Let us now assume a case in which the beam is modulated to some degree and in which, as an initial condition, the value of the collector potential is that at which the slowest beam electrons are just collected. It will be apparent that under these circumstances the condition of operation of the apparatus should remain fixed and stable. However, if the collector potential is now dropped somewhat, a certain proportion of the slower beam components, as produced by the velocity modulating action of the resonant electrode system, will be selectively reversed and returned at relatively low speed to the vicinity of the electrode system. As previously explained, their normal reaction on such system will be a damping one, and the amount of velocity modulation produced in the beam will be immediately reduced.

As a consequence of this action the number of electrons in the beam which are moving slowly enough to be reversed by the collector will be reduced, and the damping of the electrode system will tend to become less. As a result of these conflicting effects a new condition of operation will be attained in which the number of returned electrons is just that required to damp the electrode system to a condition of stable operation. By varying the potential of the collector in accordance with a signal voltage, it is possible to cause this condition of stable operation to vary correspondingly in such fashion as to obtain the effect of signal modulation of the high frequency output derived from the elements 39, 40.

As the collector potential is reduced to lower and lower values a point may be reached at which the reversed electrons have sufficient velocity so that their damping effect on the electrode system vanishes and they begin to supply energy to the system. When this condition is attained, a further increase in the modulating voltage cannot operate in the way described above to increase the percentage modulation. It is found, however, that another factor is involved which makes possible the accomplishment of substantially complete modulation.

In this connection reference is had to the fact that the electron stream approaching the collector 18 is not only velocity modulated but is also charge density modulated. In other words, as a result of the electron-sorting effects previously discussed, the electrons are caused to approach the collector in successive bunches. Under these circumstances, it is obvious that the reversed portion of the beam must also be charge density modulated in the sense of comprising spaced electron bunches.

As will be understood from the previously given theoretical discussion of the operation of the resonant electrode system, the nature of the reaction of a charge density modulated beam on the system depends upon the time relation between the instants when the electron density maxima in the beam traverse the interelectrode gaps and the cyclical alternations of the voltage appearing across said gaps. By adjusting the electron transit time between the collector and the electrode system, as, for example, by adjusting the distance between them, it can be brought about that the effect of the returned electron bunches is to damp the oscillations of the system in an increasing degree as the collector potential is increasingly lowered. Furthermore, this effect is one which continues until a condition of substantially complete damping is attained.

Figure 9:
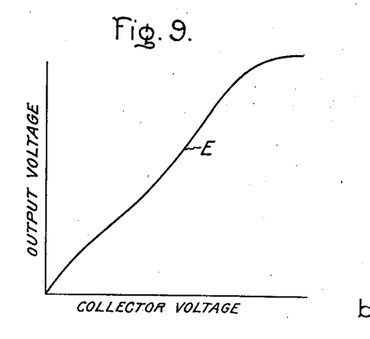

While there are probably additional factors which cause the operation of the resonant electrode system to be highly responsive to the potential variations of the collector 18, it is believed that the effects described above are the predominant ones. In any case, I have repeatedly observed that with appropriate adjustments of the tube and energizing circuit, it is possible to obtain substantially one hundred per cent modulation of the output of the resonant electrode system by varying the collector voltage. Furthermore, it is found that modulation thus accomplished is substantially linear over the entire modulating range. This is shown in Fig. 9 in which the curve E represents the observed relationship between the collector voltage and the high frequency output voltage for a practical operating condition of an apparatus such as that shown in Fig. 3.

In order to utilize the principles set forth above in order to modulate the high frequency carrier developed by the tube 10 with a signal voltage it is necessary, of course, to provide an appropriate modulating circuit. An exemplary such circuit is shown in Fig. 3 and includes a source of audio or video signal voltage suitably connected in circuit with the collector 18.

It has been found that in some cases and over certain portions of the operating range, tubes of the character shown in Fig. 3, tend to produce negative resistance characteristics in the collector circuit. In order to prevent the occurrence of objectionable oscillatory effects due to this cause it is advantageous to provide some kind of stabilizing means. One form of stabilizer useful in this connection comprises a vacuum tube amplifier 43 connected as shown. The anode 44 of the amplifier is connected directly to a positive terminal of the high voltage supply source 20 while the cathode 45 is in series circuit with the collector 18. The amplifier grid 46 is connected to the grounded or negative terminal of the supply source 20 through a condenser 47 and to the cathode through a grid leak resistor 48 of appropriately high value. A low impedance resistor 49 may be used for the purpose of providing automatic bias for the grid 46.

A typical condition of operation of the circuit thus described is that in which about 2,000 volts appears between the cathode and the collector of the high frequency tube 10 and a similar potential between the main terminals of the amplifier 43. As a result of the presence of the condenser 47 and the grid leak 48, the grid 46 will, under these circumstances, operate at a potential on the order of 2,000 volts above ground.

In the event that the potential of the collector tends to shift, due to conditions within the high frequency tube, the potential of the amplifier cathode 45 necessarily changes in similar fashion due to the substantially direct connection which exists between the cathode and the collector 18. However, the presence of the condenser 47 and the high value of the associated grid leak resistor 48 prevents any instantaneous variation in the potential of the grid 46. As a result, a change in the relative potentials of the grid and the cathode 45 takes place and, by virtue of the amplification factor of the amplifier 43, the circuit as a whole is caused to exhibit an effective positive resistance which is sufficiently low to prevent the occurrence of sporadic oscillations.

In addition to the foregoing, the functioning of the amplifier 43 as an element of the modulating circuit is essentially that of the ordinary modulating choke coil. With the arrangement shown, the modulating or signal voltage, as derived from the source 42, is introduced into the grid circuit of the amplifier 43 by means of a transformer 42'. As a result, the grid potential is caused to vary at signal frequency with respect to the relatively fixed potential of the anode 44. Assuming that the amplification factor of the amplifier is relatively large, substantially this same potential variation appears between the anode 44 and the cathode 45, with the consequence that the signal voltage is impressed on the collector 18 as desired. The ultimate result, of course, is the production of signal frequency modulation of the R. F. voltage developed at the output terminals 39 and 40.

Figure 10:
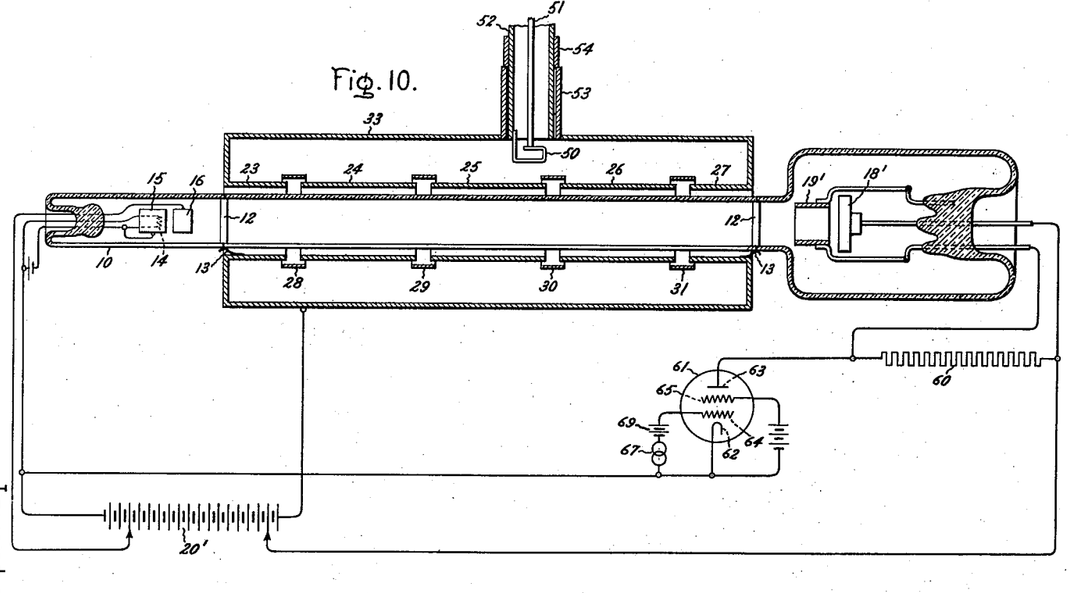
Fig. 10 shows an alternative embodiment of the invention.

In Fig. 10 there is shown an alternative embodiment of the invention. In this figure elements which correspond to elements previously described are similarly numbered. In order conveniently to differentiate elements whose functions differ somewhat from those which the corresponding elements perform in the arrangement of Fig. 3, resort has been had to the expedient of priming the index numbers of such elements.

The high frequency tube illustrated in Fig. 10 is substantially identical with that described in connection with Fig. 3 except for a change in the output system provided. In the construction now under consideration, means are employed for coupling the output system to the resonant electrode structure magnetically rather than electrostatically as in the arrangement previously described. The coupling utilized comprises simply a conductive loop 50 having one terminal thereof connected to a conductor 51 and the other terminal secured to a hollow conductor 52 which is concentric with the conductor 51. The conductor 52 is journaled relatively loosely in a sleeve 53 in such a manner as to permit the conductors 51 and 52 to be rotated, together with the coupling loop 50. Longitudinal motion of the conductors is prevented by means of an annular abutment 54 which provides a shoulder resting against the extremity of the sleeve 53.

By means of the arrangement specified, the degree of coupling between the output system and the electrode structure can be regulated as desired to suit any given condition of operation. It will be understood that when the loop 50 is in the position shown, it possesses substantially maximum coupling with respect to the high frequency current developed in the adjacent electrode 25. On the other hand, when the loop is rotated 90 degrees, its coupling with such electrode is substantially zero. Intermediate values of coupling may be obtained by using other positions of the coupling loop.

In the arrangement shown in Fig. 10, the collector 18' is connected directly to a positive terminal of the voltage source 20' so that its voltage is substantially invariable with respect to the voltage of the cathode 14. In lieu of varying the voltage of the collector in accordance with the modulating potential, this latter potential is impressed on the tubular electrode 19'.

As a modulating circuit there is provided in shunt with the high frequency tube 10 an impedance network comprising a resistance 60 of high value and a vacuum tube designated as a whole by the numeral 61. This tube is shown as comprising a cathode 62, an anode 63, a control grid 64 and a screen grid 65. It is connected in series with the resistance 60 so that only a fractional portion of the voltage of the battery 20' appears across its terminals. The relative magnitude of this portion is caused to vary by applying modulating voltage, derived from an appropriate source 67, to the control grid 64 of the tube.

In a typical condition of operation, the control grid 64 may be so biased (as by a battery 69) that half the potential of the battery 20' appears across the tube 61, the remainder being across the resistor 60. Since the electrode 19' is connected directly to the anode terminal of the tube 61 it is apparent that its normal potential will be below a value corresponding to the average velocity of the electron stream in the tube 10, such velocity being set by the potential applied to the electrodes 12. Under these circumstances the electrode 19' will tend to reverse at least the lower velocity components of the beam. Furthermore, the average velocity of the reversed components will be a function of the modulating or signal voltage which is developed across the terminals of the tube 61. The resultant effect on the high frequency output voltage supplied by the resonant electrode system of the tube 10 to the output circuit elements 50, 51 will, therefore, be substantially identical with that produced by the arrangement of Fig. 3. Specifically, modulation of the output voltage will be accomplished in accordance with the variations of the signal voltage.

Since the solid portions of the electrode 19' are out of the normal path of the beam current there is little or no current flow to this electrode. Consequently in the arrangement of Fig. 10 the insertion of a high impedance (the tube 61) in the modulating circuit introduces little likelihood of sporadic and undesired oscillations. That is, the modulating circuit is inherently stable because of the substantial absence of current flow in it.

It is important to note that in the arrangements of both Figs. 3 and 10 the generation of high frequency power in the resonant electrode system and the delivery of such power to the output elements is not dependent on the reversal of the electron stream. That is to say, abstraction of energy from the beam and the conversion of such energy into high frequency power occurs upon the initial traversal of the resonant system by the electron stream. The introduction of varying numbers of reversely flowing electrons into the vicinity of the electrode structure serves merely to vary the amplitude of the high frequency voltage delivered to the output elements.

It is further significant that in modulating arrangements of the character described, there is little or no variation in the current received by the collector 18 in spite of variations of the potential applied to the modulating element. This is due to the fact that the value of the beam current is fixed mainly by the voltage conditions existing between the electrodes of the electron gun provided at the cathode end of the tube and that these conditions are not changed in any way by variations occurring in the vicinity of the collector. While it is true that the functioning of the apparatus depends upon a partial reversal of the electron beam it is clear that even the reversed electrons must eventually be returned to the vicinity of the collector and be collected thereby, so that the average collector current remains constant.

As a consequence of the considerations stated in the foregoing it is unnecessary for the source of modulating voltage to supply power to the high frequency system in order to produce the desired functioning of the latter. In this respect, my invention differs fundamentally from any previously employed "braking field" systems with which I am familiar.

While I have described my invention in connection with specific embodiments thereof, it will be understood that numerous modifications may be made by those skilled in the art without departing from the invention. Thus, the particular sources of modulating potential described may be replaced by other known agencies such as modulating chokes, transformers or resistors. I, therefore, aim in the appended claims to cover all such equivalent variations as fall within the true spirit and scope of the foregoing disclosure.

What I claim as new and desire to secure by Letters Patent of the United States, is:

1. In transit time apparatus, a discharge device having means for producing an electron beam of substantially constant average intensity and velocity, means including a resonant system for conjointly producing velocity modulation of the beam at high frequency and for abstracting output power from the beam at such frequency during the initial traversal of the system by the beam, electrode means for reversing certain components of the beam in response to velocity variations occurring in the beam and also in response to potential variations of the electrode means, such electrode means being positioned to act on the beam only after its traversal of the said resonant system and being ineffective to change the average beam current, and means for varying the potential of the said electrode means at a signal frequency, thereby to cause the power output from said resonant system to be modulated at the signal frequency by virtue of the reaction of the reversed components of the beam on such system.

2. In high frequency apparatus, a discharge device having means for producing an electron beam, a self-enclosed resonant structure including a plurality of conductive elements arranged to provide a series of spaced gaps successively traversed by the beam, the spacing of the aforementioned gaps being such as to cause the said resonant structure to be maintained in high frequency oscillation by virtue of the interaction of the beam and structure at the gaps, output means for deriving a high frequency voltage from said resonant structure, electrode means for reversing varying portions of the beam in response to variations produced in the beam by the reaction of the said resonant structure thereon and also in response to potential variations of the electrode means, and means for varying the potential of said electrode means at a signal frequency, thereby to cause the output voltage derived from said resonant structure to be modulated at the signal frequency by virtue of the reaction of the reversed components of the beam on the structure.

3. In high frequency apparatus, an electron gun for producing an electron beam of substantially constant average intensity and velocity, a series of coaxial tubular conductive elements arranged to be successively traversed by the beam, said elements being spaced to provide a plurality of interelectrode gaps and the longitudinal dimensions of the elements being correlated to the beam velocity to assure effective mutual reaction between the beam and the elements at the gaps, additional conductive means associated with said tubular elements and forming therewith a resonant system adapted to be maintained in high frequency oscillation by the reaction of the beam thereon, means for deriving a high frequency output voltage from said resonant system, electrode means for reversing varying proportions of the beam in response to variations produced in the beam by the reaction of the said resonant system thereon, and also in response to potential variations of the electrode means, and means for varying the potential of the said electrode means at a signal frequency, thereby to cause the output voltage derived from the resonant system to be modulated at the signal frequency by virtue of the reaction of the reversed components of the beam on said system.

4. In high frequency apparatus, an electron gun for producing a beam of electrons, a series of coaxial tubular conductive elements arranged to be successively traversed by the beam, said elements being mutually spaced to provide gaps between them, a substantially continuous conductive structure enclosing the tubular elements and forming a resonant system therewith by virtue of the distributed constants of the elements and the structure, said resonant system being adapted to be maintained in high frequency oscillation by the action of the beam on said tubular elements, means for deriving a high frequency output voltage from the resonant system, means acting on the electron beam after its traversal of the said tubular elements for returning a certain portion of the beam to the vicinity of such elements, and means for varying the effect of such returned portion on the resonant system in accordance with the variations of a signal potential thereby to cause the output voltage derived from said system to be modulated at the signal frequency.

5. In high frequency apparatus, a discharge device having an electron gun for producing an electron beam of substantially contant average intensity and velocity, a plurality of conductive electrode elements arranged to provide a plurality of spaced interelectrode gaps successively traversed by the beam, additional conductive means associated with said electrode elements and forming therewith a resonant system, said system being adapted to be maintained in high frequency oscillation by the reaction of the electron beam thereon, means for deriving a high frequency output voltage from said resonant system, an electrode separate from said resonant system for collecting the beam after its traversal of the system, means for biasing said electrode to a potential at which it is effective to return the lower velocity components of the beam to the vicinity of the said electrode system, and means for varying the potential of said electrode at signal frequency, thereby to cause the output voltage derived from said resonant system to be modulated at the signal frequency by virtue of the variable reaction of the reversed components of the beam on such system.

6. In high frequency apparatus, a discharge device having an electron gun for producing an electron beam of substantially constant average intensity and velocity, a plurality of conductive electrode elements arranged to provide a plurality of spaced interelectrode gaps successively traversed by the beam, additional conductive means associated with said electrode elements and forming therewith a resonant system, said system being adapted to be maintained in high frequency oscillation by the reaction of the electron beam thereon, means for deriving a high frequency output voltage from said resonant system, an electrode separate from said resonant system for collecting the beam after its traversal of the system, an electron-permeable electrode interposed between the said resonant system and the said collecting electrode, means for biasing said electron-permeable electrode to a potential at which it is effective to return the lower velocity components of the beam to the vicinity of the said resonant system, and means for varying the potential of the said electron-permeable electrode at a signal frequency thereby to cause the output voltage derived from the said resonant system to be modulated at the signal frequency.

7. In high frequency apparatus, a discharge device having means for producing an electron beam, a self-enclosed resonant structure including spaced conductive parts arranged to be successively traversed by the beam, said structure being adapted to be maintained in high frequency oscillation by the interaction of the beam and the said conductive parts, means for deriving a high frequency output voltage from the resonant structure, electrode means for reversing varying proportions of the beam in response to variations produced in the beam by the reaction of the said resonant structure thereon, and also in response to potential variations of the electrode means, said electrode means being positioned to act on the beam only after its traversal of the resonant structure and being ineffective to change the average beam current, and means for varying the potential of the said electrode means at a signal frequency, thereby to cause the output voltage derived from said resonant structure to be modulated at the signal frequency by virtue of the reaction of the reversed components of the beam on the structure.

WILLIAM C. HAHN.